Nov. 1, 1960 M. BÄR 2,958,541
REPLACEABLE KINGPIN MOUNTING FOR SEMITRAILER COUPLINGS
Filed March 5, 1959 2 Sheets-Sheet 1

INVENTOR:
MANFRED BÄR
By Kurt Kelman
his AGENT

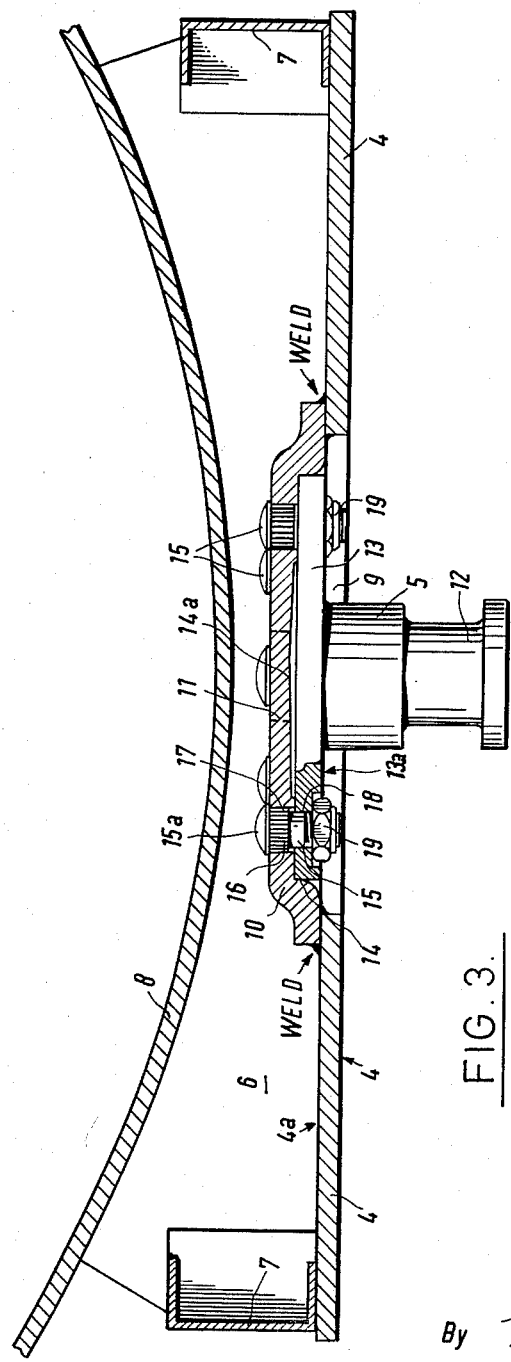

United States Patent Office 2,958,541
Patented Nov. 1, 1960

2,958,541

REPLACEABLE KINGPIN MOUNTING FOR SEMITRAILER COUPLINGS

Manfred Bär, Neu Isenburg, Germany, assignor to Jost-Werke G.m.b.H., Neu Isenburg, Germany, a corporation of Germany Filed Mar. 5, 1959, Ser. No. 797,411

Claims priority, application Germany Mar. 11, 1958

6 Claims. (Cl. 280—433)

This invention relates to semitrailer couplings and more particularly to an exchangeable kingpin therefor.

It is an object of the invention to provide a kingpin mounting for semitrailer couplings which permits exchange of the kingpin exclusively from below, whereby the costs of assembly are greatly reduced and whereby it becomes possible, when using a tank trailer, to support the tank almost directly on the coupling platform of the semitrailer tractor, so that the centre of gravity of the tank in the region of the semitrailer junction can be located much lower toward the road surface than in any known construction.

Kingpins for use in semitrailer junctions between the tractor provided with a platform and the trailer which is placed on that platform are conventionally provided with mounting flanges. In the known mountings of this type the kingpin flange is fastened by rivet or screw connection to the tractor platform and must be inserted into the latter from above when it becomes necessary to replace the same.

Another known mounting, having an exchangeable kingpin, provides for fastening the pin in a welded-in female flange therefor by means of a reduced or conical pin section and for tightening the pin in the flange by means of a nut connection. While this mounting permits to insert the pin from below, the tightening of the nut must be done from above.

In semitrailer mountings which comprise tractors having a platform equipped with special purpose mounting means, such as for receiving tank trailers thereon, the junction between the tractor platform and the special type trailer is often accessible only after the trailer has been lifted from the platform. Since the kingpin is an element of the junction subjected to ordinary wear and must, therefore, be replaced relatively often, a replacement of the same, which requires accessibility of the junction from the top, involves costs for the disassembly and reassembly of the semitrailer mounting which are out of proportion to the required job. In addition, the distance between the tank bottom portion to be supported on the trailer platform and the latter must be held relatively large in order to permit access of the necessary tools for exchanging the kingpin. This large distance between the supported trailer bottom portion and the tractor platform is well known to create a disadvantageously high position of the centre of gravity of the supported trailer portion.

These drawbacks are avoided and the object of my invention is attained by the semitrailer coupling system comprising a replaceable kingpin, provided with a fastening flange, wherein the kingpin is mounted with its flange in a recess sunk from the bottom side into a supporting plate, being part of the bottom structure of that trailer portion which is supported by the tractor platform, which recess serves for centering the kingpin which can be mounted therein from below accessible at all times, by means of a bolt connection which permits fastening of the flange to the supporting plate in different positions angularly displaced relative to each other. More in particular, the supporting plate, forming part of the bottom structure of the trailer, is provided with a large, roughly cut opening which is closed by covering it with a correspondingly shaped cover plate welded to the rim of the opening or connected in any known manner with the supporting plate. The cover plate is provided on its bottom surface with a sunk-in, preferably circular, recess of sufficient depth that the kingpin can be fitted with its fastening flange into the recess in such a manner, that the bottom surface of the flange, when inserted, is flush with the top surface of the supporting plate, i.e. the depth of the recess in the cover plate must be susbtantially equal to the thickness of the kingpin flange; thereby the conventional dimensions guarantee that a satisfactory mounting of the kingpin can be preserved. The kingpin flange is mounted in the recess of the cover plate by means of counter-sunk screws provided with self-blocking nuts, which screws are fastened on the cover plate in a conventional manner. The kingpin flange may also be fastened in the recess of the cover plate by other known fastening means provided in the cover plate and secured against turning. The recess of the cover plate takes up all vertical forces, while the screws have to support only the traction forces. It is an advantage of this kingpin mounting according to the invention that it is particularly free from play.

The kingpin mounting according to the invention can be prefabricated comprising a normal kingpin and can be mounted in a relatively roughly cut opening of the supporting plate of the trailer bottom structure and permits, during the assembly, correction of all inaccuracies due to manufacturing, thus enabling the exact centering of the kingpin. It is a further advantage of the kingpin assembly according to the invention that kingpins of standard dimensions can be used.

My invention will be still better understood from the description thereof given hereinafter in connection with the accompanying drawings in which:

Figure 3 is a sectional view through the bottom portion of the trailer taken along line III—III in Figure 2 and showing the kingpin mounting according to the invention in detail.

Figure 1:
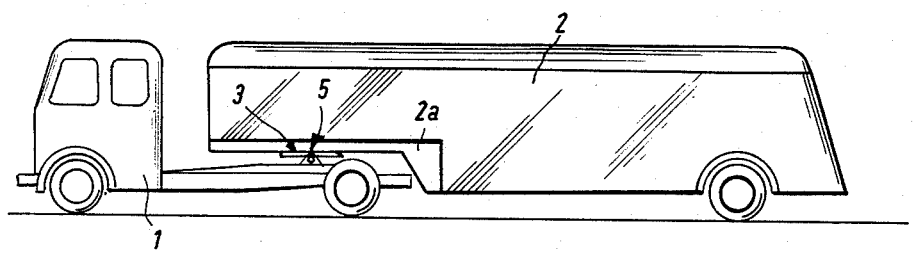
Figure 1 is the lateral schematical view of a semitrailer mounting, showing the location of the kingpin mounting according to the invention.

Referring now to the drawings more in detail and, in particular, to Figure 1, the same trailer mounting comprises the tractor 1 and the trailer 2, both being connected with each other by means of the semitrailer coupling mounting 3 which comprises kingpin 5 located in the coupling 3.

Figure 2:
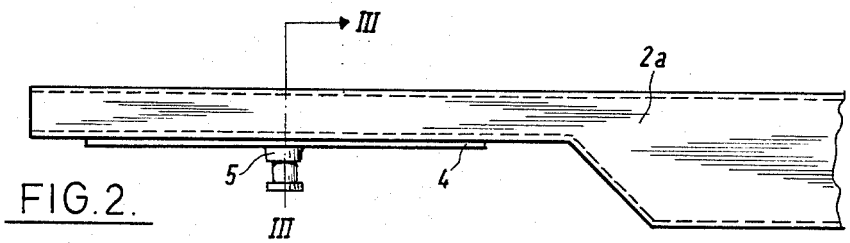
Figure 2 is the partial view of the trailer bottom portion to be supported on the tractor platform and showing the region in which the kingpin mounting according to the invention is located, in greater detail.

Figure 2 shows in more detail the bottom structure 2a of trailer 2 which is destined for being supported on the conventional supporting structure of the tractor platform. Kingpin 5 is rigidly mounted in the bottom plate 4, forming part of the chassis 6. The lower portion of the kingpin is inserted and held in a known manner in the aforesaid supporting structure. Details of this known lower portion of the semitrailer coupling are not shown.

As illustrated in Figure 3, the trailer is to comprise the tank 8, mounted on the chassis 6 which comprises two longitudinally extending supporting beams 7, welded or afterwards conventionally connected to the bottom plate 4. In the region of the semitrailer coupling, an opening 9 is cut in plate 4 and is covered by a pan-shaped cover plate 10, the concave side of which faces downwardly. Cover plate 10 is welded on to bottom plate 4 about the rim of opening 9, as shown in Figure 3. The pan-shaped cover plate 10 comprises, for example, a circular recess 14, preferably with a somewhat deeper central recess 14a in the middle of the bottom wall of recess 14, and a central window 11 may be provided in cover plate 10, as indicated by broken lines.

The kingpin 5 comprises a portion 12 of reduced diameter, destined for engaging the coupling structure on the tractor platform, and bears at its upper end the mounting flange 13, which is inserted in the recess 14 on cover plate 10. In the cover plate there are mounted, distributed in a circle in the outer marginal portion of recess 14, a number of bolts 15, provided with heads 15a, securing the bolts against dropping out of the cover plate and, furthermore, provided with teeth 16 which engage corresponding grooves in the bores 17 in cover plate 10, in which bores the bolts 15 are thus inserted, secured against turning. The bolts 15 protrude downwardly through corresponding bores 18 in flange 13, registering with the bores 17 of cover plate 10. Mounting nuts 19 are screwed on to the threaded nuts of bolts 15 which protrude downwardly out of bores 18 on flange 13, thereby ensuring a safe seating of flange 13 in recess 14 of cover plate 10. In this mounting the bottom surface 13a of flange 13 is preferably flush with the upper surface 4a of supporting plate 4, whereby the nuts 19 do not protrude from the lower face 4b of plate 4 and the entire mounting of pin 5 in the plate 4 is of the lowest possible height, thereby lowering the centre of gravity of the trailer portion above the tractor platform as closely as possible toward the road surface.

In order to replace kingpin 5 it is only necessary to unscrew nuts 19 from below and remove flange 10 together with the kingpin 5 downwardly.

Figure 4:
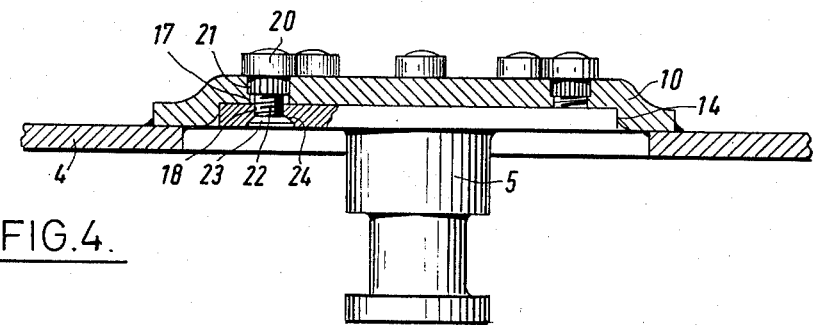
Figure 4 is a similar sectional view through a slightly different embodiment of the kingpin mounting according to the invention.

In the embodiment shown in Figure 4, self-blocking nuts 20 are inserted in bores 17 of cover plate 10, which nuts 20 have a sleeve portion bearing a toothed surface 21 for engagement in the corresponding grooves of bores 17. Flange 13 is fastened in the recess 14 of cover plate 10 by means of threaded bolts 22 inserted from below into bores 18 of flange 13 and screwed upwardly into nuts 20. The bolts 22 may be provided with low heads 23 which are sunk in corresponding counterbores 24 and flange bores 18.

The invention is not limited to the above described embodiments, but several variations of the same with regard to the type of fastening of the flange in the cover plate are possible, the main feature of the invention being that the kingpin flange is detachably fastened from below in the bottom supporting plate or a corresponding part of the trailer chassis, so that practically no space is required for housing parts of the semitrailer coupling above the kingpin. This feature makes the kingpin mounting according to the invention particularly suited for use with tank trailers.

It will be understood that this invention is susceptible to modification in order to adapt it to different usages and conditions, and, accordingly, it is desired to comprehend such modifications within this invention as may fall within the scope of the appended claims.

I claim:
1. A semi-trailer coupling for connecting the front portion of a trailer, tank trailer or the like to the mounting platform of a traction vehicle, comprising in combination: plate means forming the bottom structure of said trailer front portion and being adapted to be supported by and in gliding contact with said mounting platform, said plate means having an inverted dish-shaped portion forming a downwardly opening recess, said mounting platform having an opening, a kingpin having flange means at one end thereof, the other end of said kingpin being adapted to pass through said opening, and fastening means for detachably securing said flange means to the bottom face of said dish portion within said recess, said fastening means being operable from below, whereby said kingpin is attachable to and detachable from said dish portion from below said plate means.

2. A semi-trailer coupling as claimed in claim 1, wherein said plate means comprise a bottom plate, having a roughly cut opening therein, and a cover plate welded on to said bottom plate, so as to cover said opening, said cover plate being formed with the recess for receiving said flange means therein.

3. A semi-trailer coupling as claimed in claim 1, wherein said flange means and said fastening means are located within said recess without protruding therefrom.

4. A semi-trailer coupling as claimed in claim 1, said plate means and said flange means having a plurality of spaced and aligned bores, bolt means passing through said bores and projecting from said flange means, said fastening means comprising nut means adapted to be screwed onto the projecting portion of the bolt means.

5. A semi-trailer coupling as claimed in claim 4, wherein the walls of the bores in said plate means are provided with grooves and the bolt means have complementarily shaped teeth for engagement therewith.

6. A semi-trailer coupling as claimed in claim 1, said plate means and said flange means having a plurality of spaced and aligned bores, nut means stationarily mounted within the bores of said plate means, and said fastening means comprising screw bolts adapted to be passed through the bores in said flange means and screwed into said nut means.

References Cited in the file of this patent

UNITED STATES PATENTS

| | | |
|---|---|---|
| 1,078,801 | Musting | Nov. 18, 1913 |
| 1,272,486 | McManis | July 16, 1918 |
| 1,986,149 | Harris | Jan. 1, 1935 |
| 2,340,628 | Theriault | Feb. 1, 1944 |
| 2,738,988 | Claussen et al. | Mar. 20, 1956 |
| 2,838,324 | Dalton | June 10, 1958 |